US007540446B2

(12) United States Patent
Asano

(10) Patent No.: US 7,540,446 B2
(45) Date of Patent: Jun. 2, 2009

(54) RECORDING TAPE CARTRIDGE

(75) Inventor: Katsuki Asano, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 556 days.

(21) Appl. No.: 11/353,069

(22) Filed: Feb. 14, 2006

(65) Prior Publication Data
US 2006/0186243 A1   Aug. 24, 2006

(30) Foreign Application Priority Data
Feb. 18, 2005   (JP)   ............... 2005-042932

(51) Int. Cl.
G11B 23/04   (2006.01)
(52) U.S. Cl. .............. 242/348; 242/338.1; 242/343.2
(58) Field of Classification Search .............. 242/338, 242/338.1, 343, 343.1, 343.2, 348
See application file for complete search history.

(56) References Cited

U.S. PATENT DOCUMENTS

| 6,929,207 | B2 * | 8/2005 | Aaron et al. | ............. | 242/338.1 |
| 2004/0056132 | A1 |  5/2004 | Tsuyuki et al. | | |
| 2004/0099758 | A1 |  5/2004 | Tsuyuki et al. | | |
| 2005/0023394 | A1 * |  2/2005 | Fujii et al. | ............... | 242/338.1 |
| 2006/0169818 | A1 * |  8/2006 | Morita et al. | ............. | 242/338.1 |
| 2006/0186243 | A1 * |  8/2006 | Asano | ...................... | 242/338.1 |

FOREIGN PATENT DOCUMENTS

| JP | A 11-273307 | 10/1999 |
| JP | A 11-297035 | 10/1999 |
| JP | A 11-353850 | 12/1999 |
| JP | A 2003-100051 | 4/2003 |

OTHER PUBLICATIONS

Extended European Search Report corresponding to the U.S. Appl. No. 11/353,069, filed Sep. 17, 2007, FujiFilm Corporation.
Notice of Reasons for Rejection issued against the Japanese patent application No. 2005-042932 and its English translation, Jul. 15, 2008, FujiFilm Corporation.

* cited by examiner

*Primary Examiner*—William A Rivera
(74) *Attorney, Agent, or Firm*—Margaret A. Burke; Sheldon J. Moss

(57) ABSTRACT

A recording tape cartridge includes: a reel having a cylindrical hub with a bottom and a reel gear formed therein with recording tape wound therearound; a casing; a brake component; and a releasing component that is provided between the bottom of the hub and the brake component and which has plural legs inserted through plural through-holes formed on the reel gear where, when in use, the plural legs are pressed upwards by a drive gear of a drive device, whereby the releasing component lifts the brake component, releases engagement with the engaging portion and rotates with the reel. The legs are formed into approximate D shapes in plan view whose outer side surfaces facing an inner peripheral surface of the hub are flat surfaces, while the through-holes are formed into approximate D shapes in plan view through which the legs can each be inserted.

15 Claims, 9 Drawing Sheets

RECORDING TAPE CARTRIDGE

CROSS-REFERENCE TO RELATED APPLICATION

This application claims priority under 35 USC 119 from Japanese Patent Application No. 2005-042932, the disclosure of which is incorporated by reference herein.

BACKGROUND OF THE INVENTION

1. Field of the Invention

The present invention relates to a recording tape cartridge that accommodates, inside a casing, recording tape such as magnetic tape that is used as a recording and playback medium mainly for devices such as computers.

2. Description of the Related Art

Conventional recording tape cartridges are known where recording tape of magnetic tape and the like used as data recording/playback media primarily for computers is wound around a single reel, which is accommodated inside a casing. These types of recording tape cartridges are equipped with braking means that stop the reel from rotating inside the casing when the cartridge is not in use.

To be more specific, the reel is provided with a cylindrical reel hub having a bottom, and a brake component that serves as the braking means inside the reel hub is provided so as to be both non-rotatable relative to the casing and biased downwards. The brake component is made from a resin material and a brake gear is formed on the bottom surface thereof. This brake gear meshes with an engaging gear formed inside the reel hub, whereby rotation of the reel is blocked.

Further, a releasing component, which appears triangular when viewed as a flat surface and which is formed from a resin material, is provided between the bottom wall of the reel hub and the brake component. The center of the top surface of the releasing component abuts the center of the bottom surface of the brake component. Leg portions are provided so as to protrude from each tip portion of this releasing component. These leg portions are inserted through through-holes provided on a reel gear and they protrude at preset heights from the bottom surface of the bottom wall of the reel hub.

Accordingly, when the recording tape cartridge is loaded into a drive device, the brake component is pressed upwards via the releasing component (i.e., the leg portions) with the action of a drive gear formed on the rotation shaft of the drive device meshing with the reel gear, whereby meshing of the brake gear relative to the engaging gear is released. Due to this, the reel is allowed to rotate and the releasing component rotates with the reel. (See, for example, the Official Gazette of Japanese Patent Application Laid-Open (JP-A) No. 11-353850.)

In a recording tape cartridge configured in this manner, the through-holes provided on the reel gear are generally circular and are formed to be rectangular longer in the circumferential direction. Accordingly, the shapes of the leg portions of the releasing component are also either formed into cylindrical or quadrangular shapes. When the leg portions of the releasing component are quadrangular shapes, a set of boxes is used to form them, and this is disadvantageous in that metal mold processing is not easy and burrs are likely to form in the formed components.

In contrast, when the leg portions of the releasing component are made in cylindrical shapes, it is not necessary to use a set of boxes to form them so metal mold processing is easier. Further, there is an advantage when forming with a metal mold in that the flowing attributes (i.e., forming characteristics) of the resin material flowing towards the external side from the central portion in contact with the brake component are also better. Nonetheless, this is still problematic in that the sizes of the leg portions are larger than when the leg portions are formed into quadrangular shapes.

With recent recording tape cartridges, a problem has arisen with the ever-increasing drive for high-capacity recording, specifically in the rigidity of the reel hubs around which the recording tape is wound (i.e., collapsing deformation of the reel hub occurs). In response, measures have been considered in which the thickness of the reel hub is increased. When increasing the thickness of the reel hub, the inner side (i.e., towards the center of the reel hub) is thickened in order to ensure that the needed capacity can be provided. However, in the case of a recording tape cartridge having a releasing component, there is a limit to how much the reel hub can be thickened when the through-holes through which the leg portions are inserted are circular.

SUMMARY OF THE INVENTION

The present invention provides a recording tape cartridge whose hub can be thickened to accommodate increase in recording capacity even when provided with a releasing component, and which does not sacrifice forming characteristics of components such as the releasing component.

The recording tape cartridge of a first aspect of the present invention includes: a reel having a cylindrical hub with a bottom and a reel gear formed therein with recording tape wound around the outer peripheral surface of the hub; a casing in which the reel is singly and rotatably accommodated; a brake component that is provided inside the hub and made to be non-rotatable relative to the casing and which, when not in use, engages an engaging portion formed in the hub and blocks rotation of the reel; and a releasing component that is provided between the bottom of the hub and the brake component and which has multiple legs inserted through multiple through-holes formed on the reel gear. When in use, the multiple legs are pressed upwards by a drive gear of a drive device, whereby the releasing component lifts the brake component, releases engagement with the engaging portion, and rotates with the reel. The legs are formed into approximate D shapes in plan view whose outer side surfaces facing an inner peripheral surface of the hub are flat surfaces, while the through-holes are formed into approximate D shapes in plan view through which the legs can each be inserted.

The recording tape cartridge of a second aspect of the present invention includes: a reel having a cylindrical hub with a bottom and a reel gear formed therein with recording tape wound around the outer peripheral surface of the hub; a casing in which the reel is singly and rotatably accommodated; a brake component that is provided inside the hub and made to be non-rotatable relative to the casing and which, when not in use, engages an engaging portion formed in the hub and blocks rotation of the reel; and a releasing component that is provided between the bottom of the hub and the brake component and which has multiple legs inserted through multiple through-holes formed on the reel gear. When in use, the multiple legs are pressed upwards by a drive gear of a drive device, whereby the releasing component lifts the brake component, releases engagement with the engaging portion and rotates with the reel. The legs are formed into approximate D shapes in plan view whose outer side surfaces facing an inner peripheral surface of the hub are curved surfaces parallel to the inner peripheral surface of the hub, while the through-holes are formed into approximate D shapes in plan view through which the legs can each be inserted.

The recording tape cartridge of the third aspect of the present invention includes: a reel having a cylindrical hub with a bottom and a reel gear formed therein with recording tape wound around the outer peripheral surface of the hub; a casing in which the reel is singly and rotatably accommodated; a brake component that is provided inside the hub and made to be non-rotatable relative to the casing and which, when not in use, engages an engaging portion formed in the hub and blocks rotation of the reel; and a releasing component that is provided between the bottom of the hub and the brake component and which has multiple legs inserted through multiple through-holes formed on the reel gear. When in use, the multiple legs are pressed upwards by a drive gear of a drive device, whereby the releasing component lifts the brake component, releases engagement with the engaging portion and rotates with the reel. The legs are formed into approximate D shapes in plan view whose outer side surfaces facing an inner peripheral surface of the hub have a radius of curvature that is two times or more the radius of curvature of inner side surfaces thereof, while the through-holes are formed into approximate D shapes in plan view through which the legs can each be inserted.

DETAILED DESCRIPTION OF THE INVENTION

Figure 1:
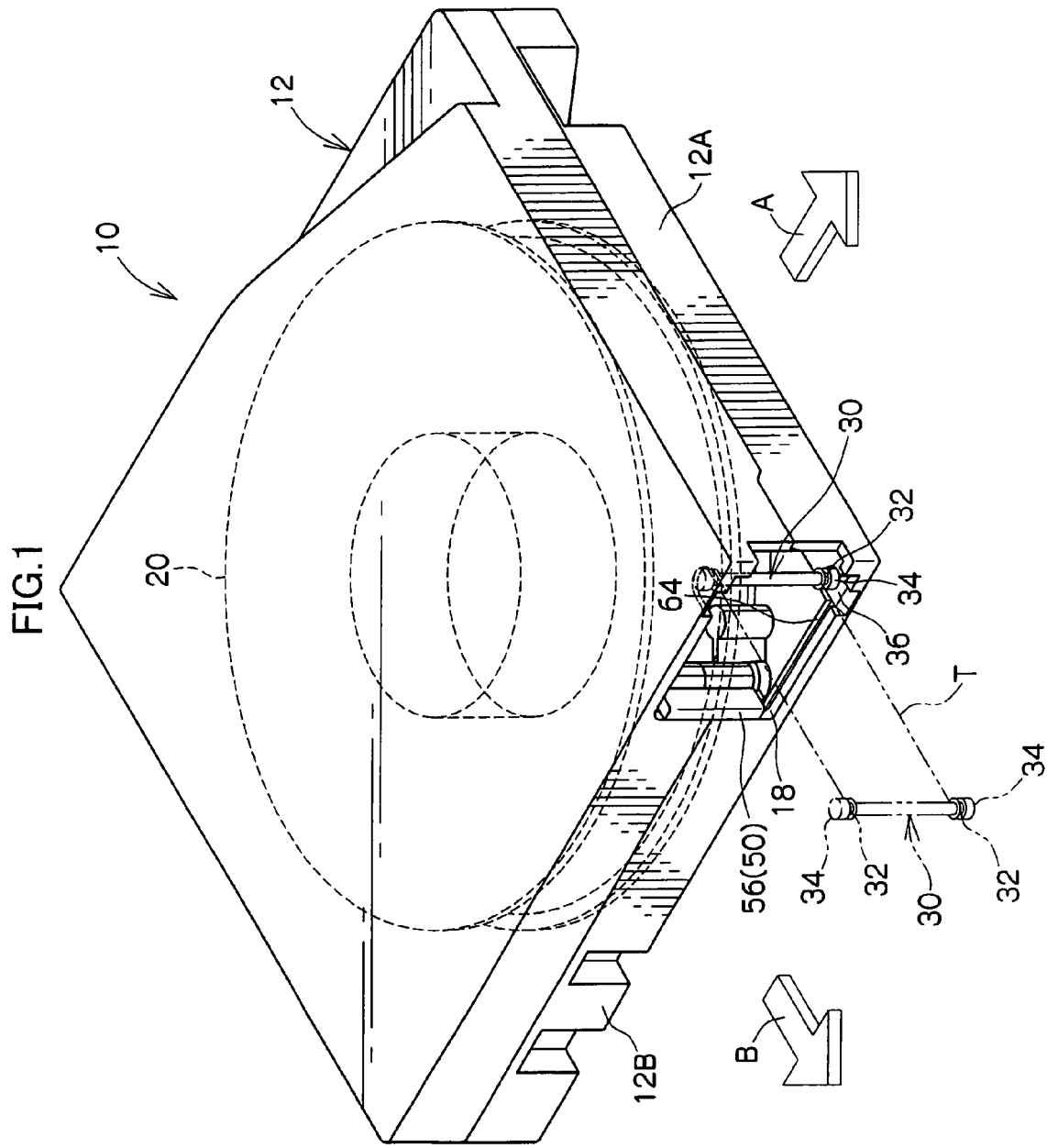
FIG. 1 is an outline perspective drawing of a recording tape cartridge.

Hereafter, embodiments of the present invention will be described in detail based on the examples shown in the drawings. For ease of explanation, in FIG. 1, the loading direction for a recording tape cartridge 10 to a drive device is indicated with the arrow marked "A", which is the front direction (i.e., front side) of the recording tape cartridge 10. The direction of the arrow marked "B" that is perpendicular to the arrow A is the direction to the right (i.e., right side).

Figure 2:
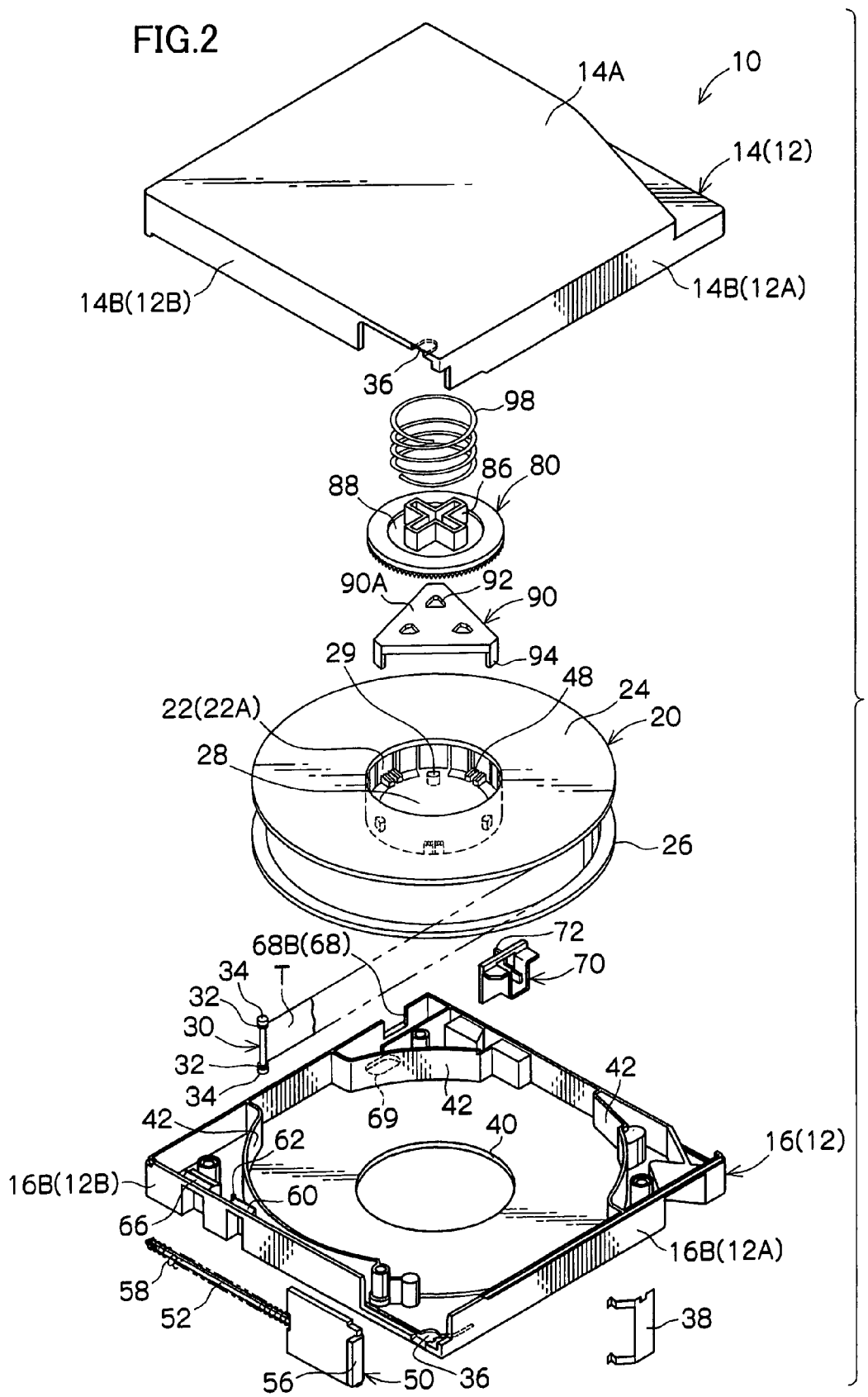
FIG. 2 is an exploded outline perspective drawing of a recording tape cartridge when viewed from above.
Figure 3:
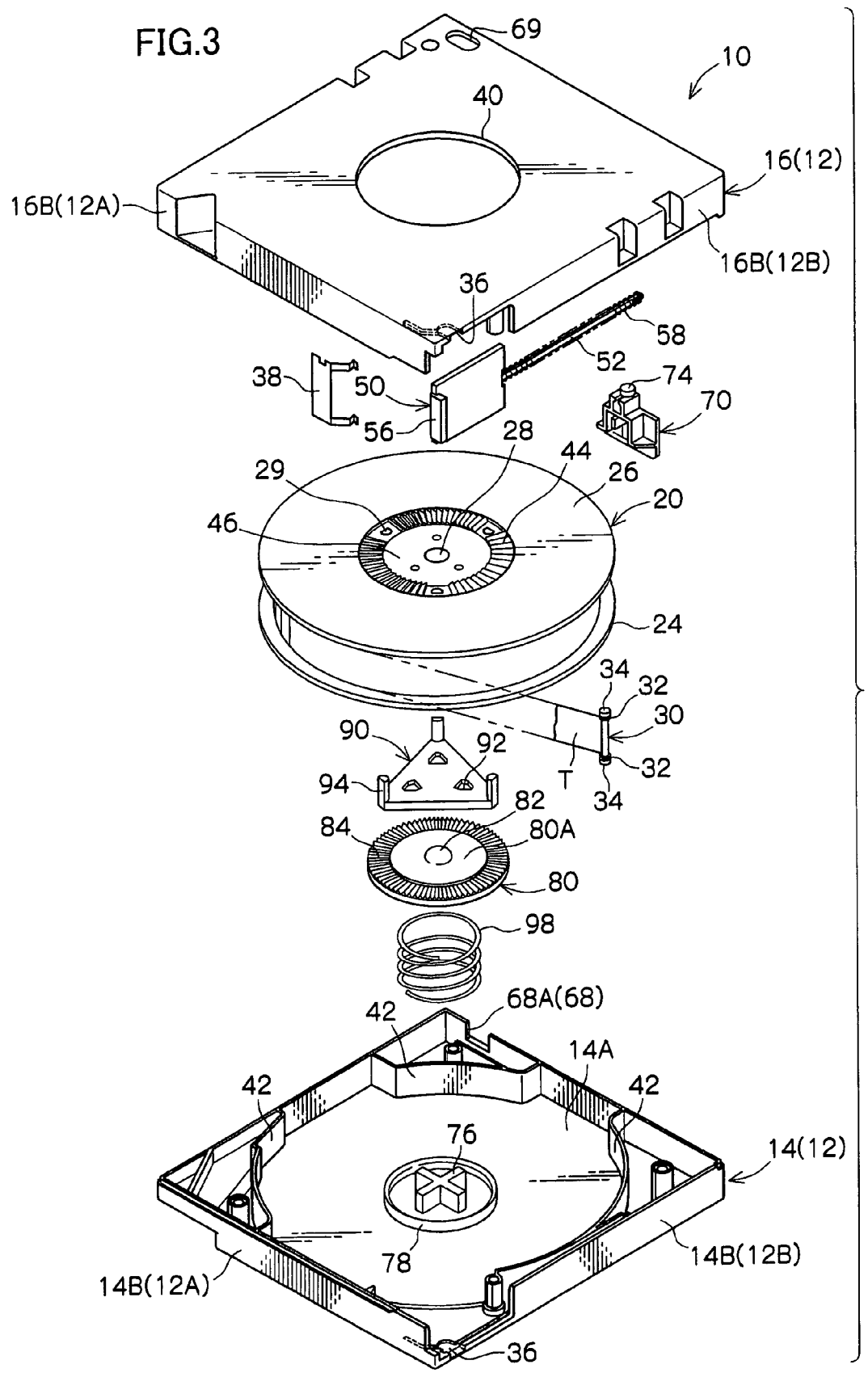
FIG. 3 is an exploded outline perspective drawing of a recording tape cartridge when viewed from below.

As shown in FIGS. 1-3, the recording tape cartridge 10 has a substantially rectangular box-shaped casing 12. This casing 12 includes a top casing 14 and a bottom casing 16 made from a resin of polycarbonate (PC) and the like. A peripheral wall 14B provided so as to extend from the peripheral edge of a top panel 14A and a peripheral wall 16B provided so as to extend from the peripheral edge of a bottom panel 16A are in a state where these are each brought into contact with each other. These are configured to be joined by means such as supersonic wave adhesion or screws and the like.

One reel 20 only is rotatably accommodated in the interior of the casing 12. This reel 20 is uniformly formed with a cylindrical reel hub 22 having a bottom that forms the central axis portion and with a lower flange 26 provided at the bottom portion of the reel hub 22. An upper flange 24 is configured to be adhered with supersonic wave adhesion to the top end portion of the reel hub 22. A recording tape T such as magnetic tape is wound around the outer peripheral surface of the reel hub 22 and acts as information recording/playback medium. The end portions in the widthwise direction of the wound recording tape T are retained by the upper flange 24 and the lower flange 26.

Figure 9A:
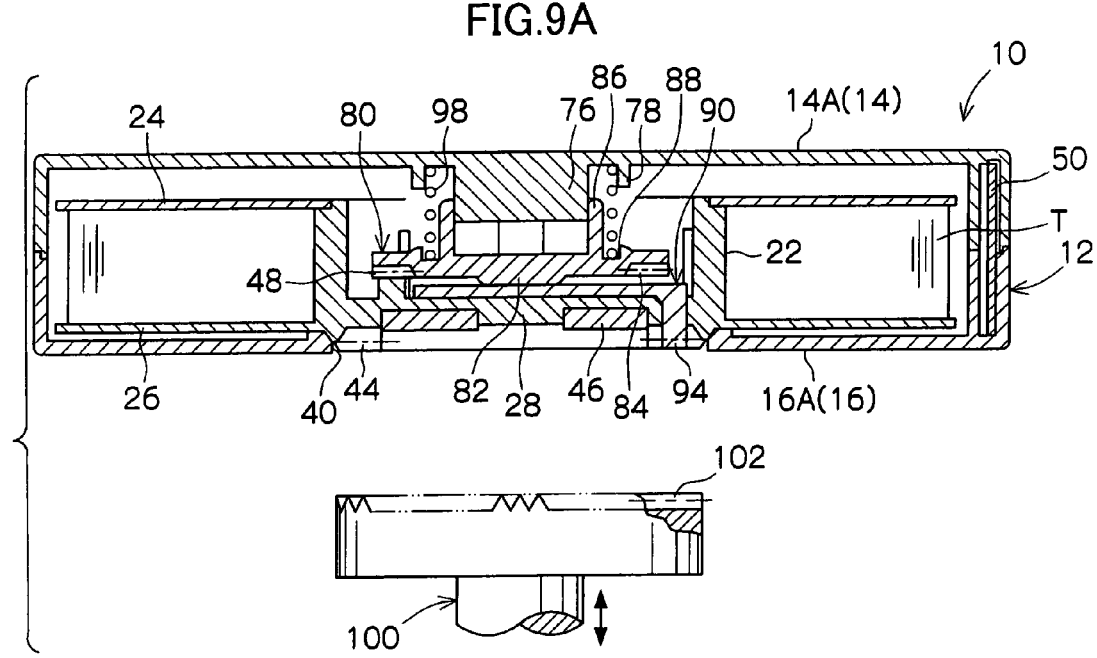
FIG. 9A is an outline side cross-sectional drawing showing a recording tape cartridge prior to meshing of a drive gear of a rotation shaft.

Further, a reel gear 44 is formed into an annular shape at the bottom surface of a bottom wall 28 of the reel hub 22. A gear opening 40 is provided in the central portion of the bottom casing 16 in order to expose the reel gear 44 to the exterior. The reel gear 44 exposed from this gear opening 40 is engaged and rotatably driven with a drive gear 102 formed at a rotation shaft 100 of the drive device (see FIG. 9), whereby the reel 20 can be rotated relative to the casing 12 inside the casing 12.

An annular reel plate 46 made from a magnetic material is fixed by a process such as insert forming at the inner sides of the reel gear 44 in the diameter direction thereof at the bottom surface of the bottom wall 28, and is attached and retained by the magnetic force of a circular magnet (not shown) provided at the rotation shaft 100 of the drive device. Furthermore, the reel 20 is retained by a play-restricting wall 42 so as not to shake. The play-restricting wall 42 is provided so as to partially protrude toward the inner surfaces of each of the top casing 14 and the bottom casing 16, and acts as an inner wall on a circular track that is coaxial with the gear opening 40.

Further, an opening 18 is formed in a right wall 12B of the casing 12 for pulling out the recording tape T wound around the reel 20. A leader pin 30 is fixed to the free end of the recording tape T pulled out from the opening 18 while being maneuvered so as to be pulled out by a pull-out component of the drive device to which the leader pin 30 is latched (i.e., engaged).

Circular grooves 32 are formed at both ends of the leader pin 30 that protrude in the widthwise directions of the recording tape T, and these circular groove 32 are latched to a component such as a hook of the pull-out component. Due to this configuration, the hook and the like do not touch or damage the recording tape T when pulling out the recording tape T.

Further, a pair of upper and lower pin-retaining portions 36 that position and retain the leader pin 30 are provided at the inner side of the opening 18 in the casing 12, that is, in the inner surfaces of the top panel 14A of the top casing 14 and the bottom panel 16A of the bottom casing 16. These pin-retaining portions 36 are formed into approximate semi-circle shapes open to the side from which the recording tape T is pulled out, and end portions 34 of the leader pin 30 are made so as to be insertable and removable from the open sides of the pin-retaining portions 36 when the leader pin 30 is in an upright state.

A board spring 38 is also fixed and arranged in the vicinity of the pin-retaining portions 36. The tips of the fork-shaped board spring 38 engage with each of the upper and lower end portions 34 and are made to retain the leader pin 30 in the pin-retaining portions 36. It should be noted that the board spring 38 is configured so that the ends elastically deform as needed when the leader pin 30 is inserted and removed from the pin-retaining portions 36 so as to allow movement of the leader pin 30.

Figure 4:
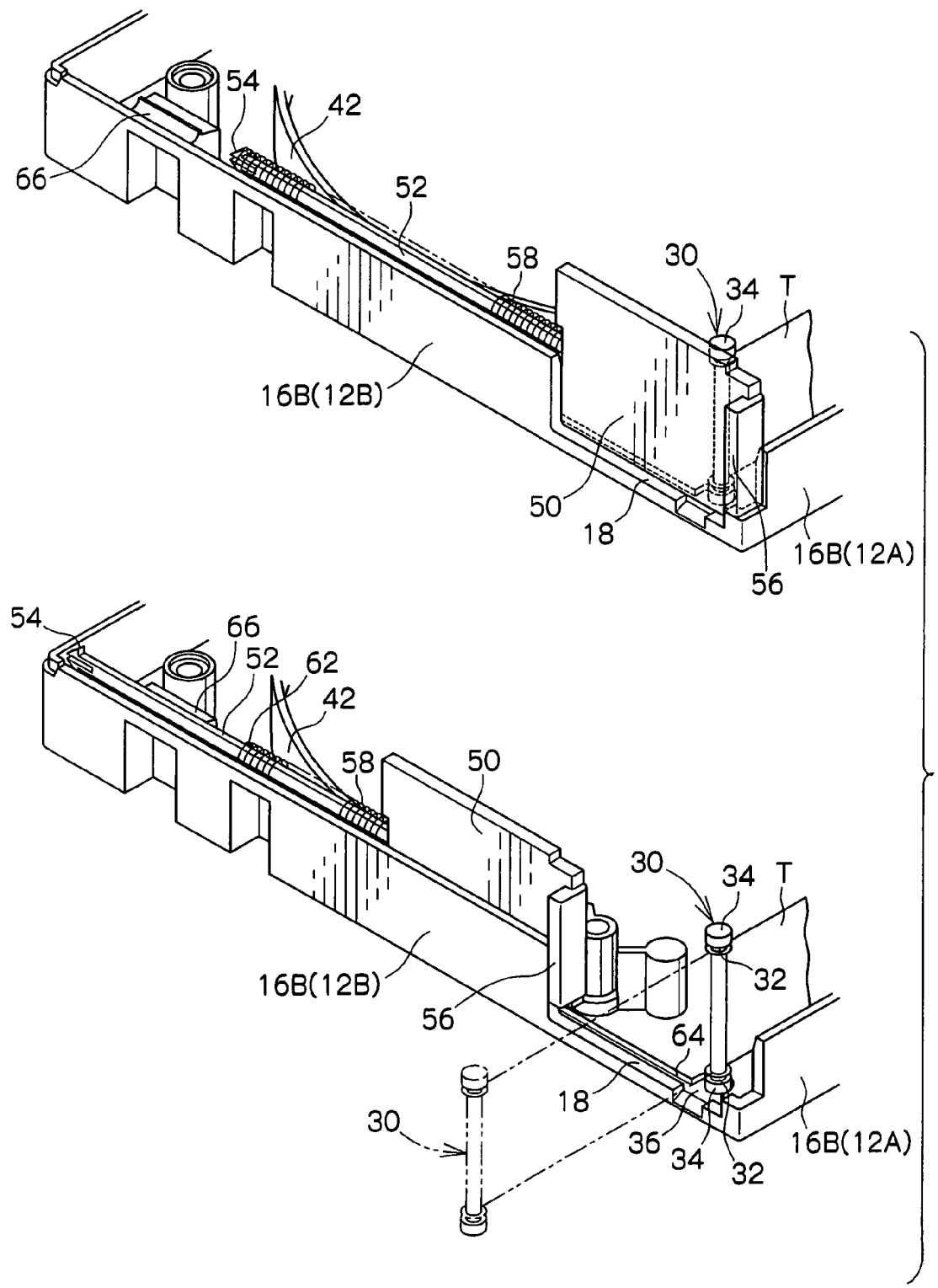
FIG. 4 is an outline perspective drawing showing a door and opening portion of a case.

Further, the opening 18 is opened and closed with a door 50. As shown in detail in FIG. 4, the door 50 is formed into a substantially rectangular board shape having a size that can seal the opening 18. Grooves 64 are formed in the top panel 14A and the bottom panel 16A at the inner sides of the opening 18 along the right wall 12B of the casing 12. The grooves are formed such that the upper and lower ends of the door 50 can be fit therein and slid so the door 50 can move.

A shaft 52 is also provided so as to protrude at the center of the rear end portion of the door 50, and a coil spring 58 is inserted and fit onto this shaft 52. An expanding portion 54 is formed at the rear end of the shaft 52 to prevent the coil spring 58 from falling off. A support plate 60 having a latching portion 62 that latches the rear end of the coil spring 58 inserted and fit on the shaft 52 is also provided so as to protrude from the bottom casing 16.

Accordingly, the door 50 is configured so that the shaft 52 is supported to be fully slidable on the support plate 60 and the rear end of the coil spring 58 is latched to the latching portion 62, whereby the door 50 is always biased towards the closed direction of the opening 18 by the biasing force of the coil spring 58. It should be noted that it is preferable to further provide a support plate 66 so as to protrude, which supports the shaft 52 at the rear end side of the support plate 60 for when the opening 18 is open.

A protrusion 56 for operation of opening and closing is provided at the front end portion of the door 50 so as to protrude towards the exterior. This protrusion 56 is designed to engage with an opening/closing component (not shown) on the drive device side with the loading of the recording tape cartridge 10 to the drive device. Due to this, the door 50 is configured to resist the biasing force of the coil spring 58 and be open.

Further, as shown in FIGS. 2 and 3, a write-protect 70 set to make recording to the recording tape T possible or impossible is provided so as to be slidable in the left and right directions at the left rear portion of the casing 12. A hole 68 through which a manual switch 72 protrudes for manually operating this write-protect 70 is formed in the rear wall of the casing 12. This hole 68 is configured to be formed from a notch 68A formed from the peripheral wall 14B and top casing 14 and a notch 68B formed from the peripheral wall 16B of the bottom casing 16 when the top casing 14 and the bottom casing 16 are joined.

Furthermore, a long hole 69 through which a protrusion 74 of the write-protect 70 is exposed is provided in the bottom casing 16 along the left and right directions. The position of the write-protect 70 is detected at the drive device side when the recording tape cartridge 10 is loaded into the drive device so as to automatically determine whether recording to the recording tape T is possible or not. It should be noted that this protrusion 74 does not protrude from the bottom surface of the bottom casing 16.

Further, as shown in detail in FIG. 6, multiple engaging gears 48 (e.g., three at intervals of 120°) are provided so as to stand from the peripheral edges on the top surface of the bottom wall 28 of the reel hub 22 and to be separated at preset intervals. Multiple through-holes 29 (in this case, three at intervals of 120°) are provided at preset positions on the reel gear 44 between these engaging gears 48. A circular disc brake component 80 formed from a resin material is provided so as to be inserted at the interior of the reel hub 22.

As shown in FIGS. 2 and 3, brake gears 84 that can engage with the engaging gears 48 are formed in a circle on the peripheral edge of a bottom surface 80A of the brake component 80. Rotation-restricting ribs 76 formed in a cross shape when viewed as a planar surface are provided on the upper surface of the brake component 80 so as to protrude from the inner surface of the top panel 14A of the top casing 14 towards the downward side. The rotation-restricting ribs 76 are inserted into the interior of engaging protrusions 86 that also have a cross shape when viewed as a planar surface, and the height of the engaging protrusions 86 are provided to stand slightly taller than the height of the rotation-restricting ribs 76. Due to this, the brake component 80 cannot be rotated relative to the casing 12 (i.e., the top casing 14) but it is movable in the up and down directions inside the reel hub 22.

A compressed coil spring 98 is also arranged between the top casing 14 and the brake component 80. That is, one end of the compressed coil spring 98 comes into contact with the inner side of a circular protrusion 78 arranged so as to protrude towards the exterior side of the rotation-restricting ribs 76 of the top casing 14 (i.e., between the rotation-restricting ribs 76 and the circular protrusion 78) and the other end is arranged in a state where it is in contact with the inside of an annular groove 88 provided on the upper surface of the brake component 80. The brake component 80 is usually biased downwards due to the biasing force of this compressed coil spring 98.

Accordingly, the brake gears 84 are usually in state where they are engaged with the engaging gears 48 when the recording tape cartridge 10 is not in use (i.e., when the tape is not loaded into a drive device) and is in a state of rotational lock where the gears are blocked from rotating relative to the casing 12 of the reel 20. It should be noted that at this time, the reel 20 is pressed towards the bottom casing 16 side by this biasing force and this exposes the reel gear 44 from the gear opening 40.

A releasing component 90 made from a resin material that appears as substantially triangularly-shaped when viewed as a planar surface is also inserted and provided at the interior of the reel hub 22 and the underside of the brake component 80 (i.e., between the bottom wall 28 and the brake component 80). As shown in detail in FIG. 5, multiple through-holes 92 having preset shapes are provided at the appropriate positions (in the releasing component 90 shown in the drawings, there are three hexagonally shaped through-holes 92) and these are designed to lighten the releasing component 90.

Further, legs 94 provided at the bottom surface of the releasing component 90 at each tip portion thereof. The legs 94 are inserted through the through-holes 29 from the bottom surface of the bottom wall 28 to protrude at preset heights on the reel gear 44. A substantially semi-spherical releasing protrusion 82 that protrudes from the center of the bottom surface 80A of the brake component 80 is made to contact an upper surface 90A that is the flat surface of the releasing component 90 (see FIGS. 2 and 3).

By configuring the invention in this manner, the contact area of the brake component 80 and the releasing component 90 is reduced as much as possible, and the sliding resistance during use (i.e., when the reel 20 is rotated) is made to be lightened as much as possible. It should be noted that, for example, polyacetal (POM) can be used for the material for the brake component 80 and polybuthylene terephthalete (PBT) can be used for the material of the releasing component 90. Further, a load of, for example, 4.2 N is placed on the releasing component 90 due to the biasing force of the compressed coil spring 98 from the brake component 80 side.

Figure 5:
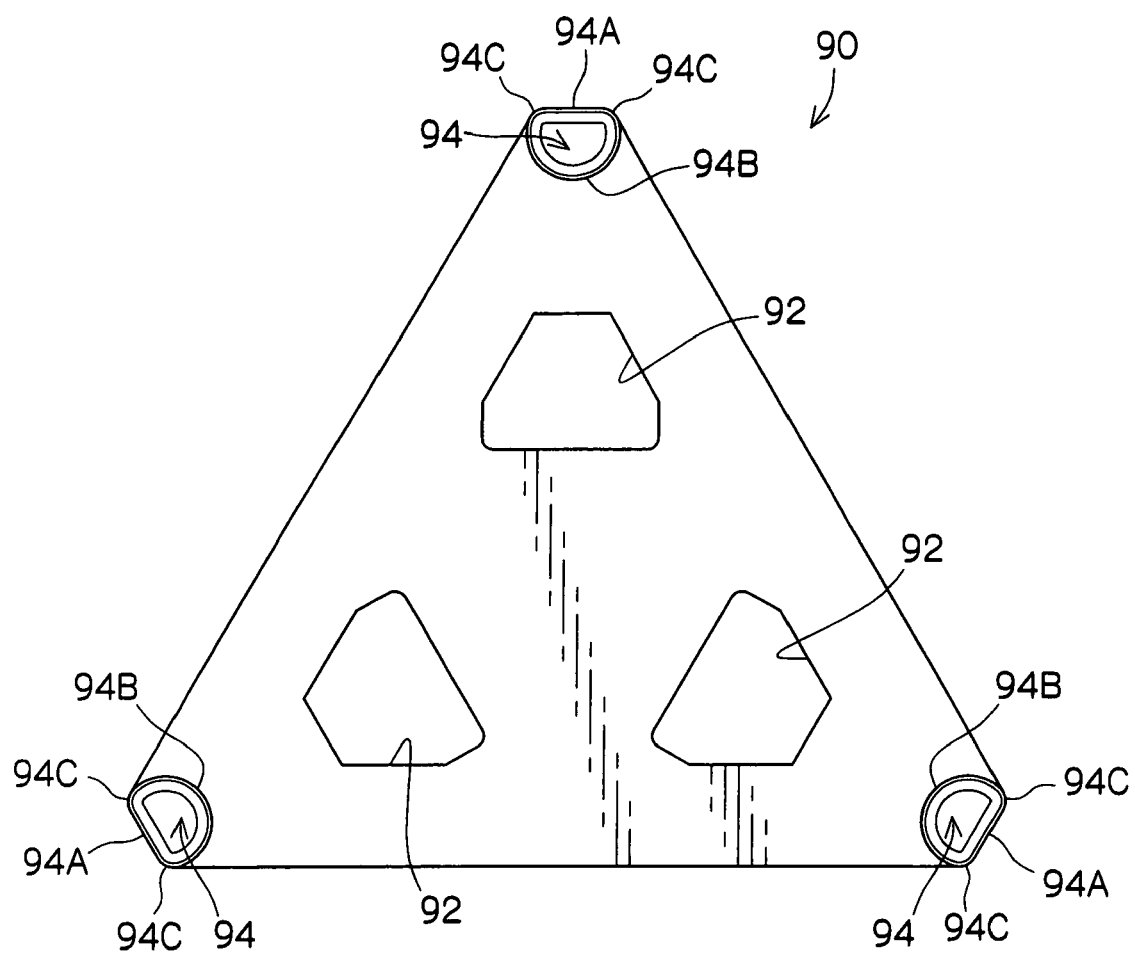
FIG. 5 is an outline bottom surface drawing of a release component.
Figure 6A:
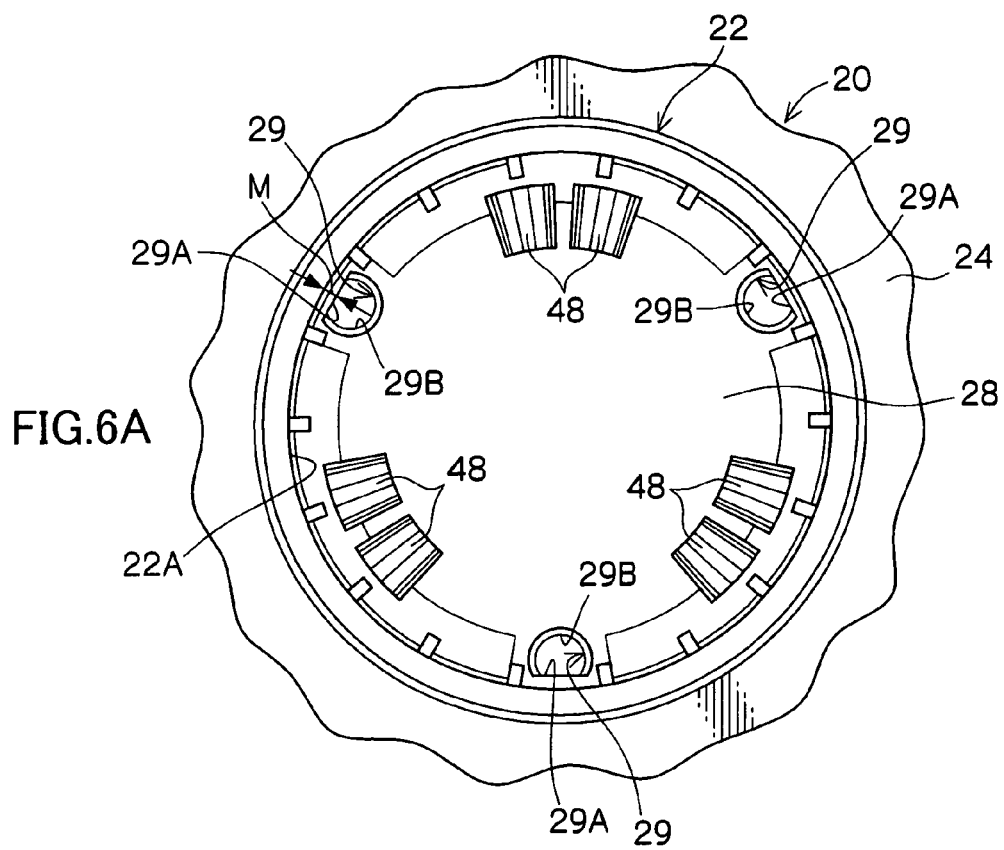
FIG. 6A is an outline planar drawing of a reel hub.

Further, as shown in detail in FIG. 5, the legs 94 of the releasing component upper surface 90 are formed into approximate flat D shapes when viewed flat from the side of outer surfaces 94A that are opposite an inner peripheral surface 22A of the reel hub 22 (see FIG. 6A). As shown in detail in FIG. 6, the through-holes 29 through which the legs 94 are inserted also have inner peripheral surface sides 29A (hereafter, "outer periphery portions") of the reel hub 22 that are shaped into approximate straight-line D shapes.

By configuring the invention in this manner, a large margin can be taken at a planar view of the inner peripheral surface 22A of the reel hub 22 and the through-holes 29 (i.e., the outer peripheral portions 29A) so the thickness of the reel hub 22 can formed to be thicker towards the inner side (i.e., the center of the reel hub 22, see FIG. 9). Accordingly, the rigidity of the reel hub 22 can be ensured and the recording tape cartridge 10 having the releasing component 90 can be used to increase high-capacity recording capability.

It should be noted that even if the thickness of the reel hub 22 is increased, it is preferable for a certain amount of margin space M (see FIG. 6A) to be formed between the inner peripheral surface 22A of the reel hub 22 and the through-holes 29 (i.e., the outer peripheral portions 29A). If the device is configured in this manner, the assembling compatibility for when the releasing component 90 is inserted and set in the reel hub 22 can be ensured.

Further, the shapes of the legs 94 are not limited to those shown in FIGS. 5 and 6. For example, as shown in FIG. 7, the outer surface 94A side corresponding to the inner peripheral surface 22A of the reel hub 22 can be formed into a planar D shape bent parallel with the inner peripheral surface 22A of the reel hub 22 (i.e., into a concentric circular arc surface). In this case, the shape of the through-hole 29 is of course also formed so that the outer peripheral portion 29A has a planar D shape parallel to the inner peripheral surface 22A of the reel hub 22 such that the legs 94 can be inserted through.

Figure 8A:
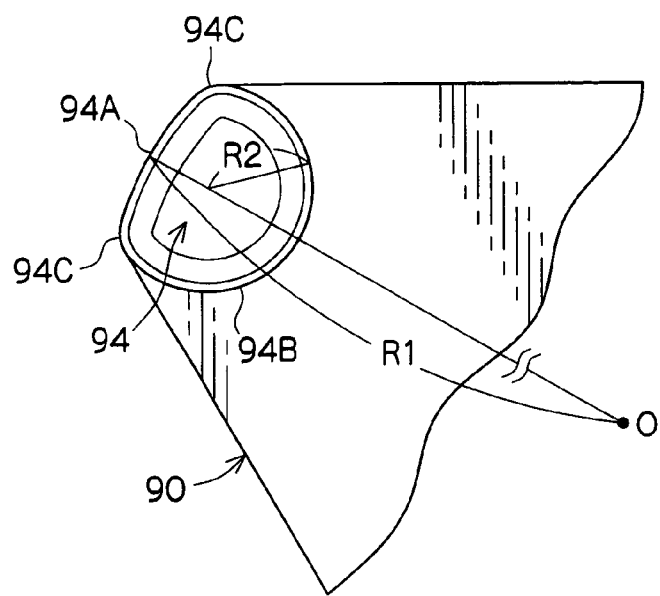
FIG. 8A is a partial outline bottom surface drawing of a release component.

Furthermore, the shape of the leg 94, as shown, for example, in FIG. 8, can have a radius of curvature R1 of the outer surface 94A side facing the inner peripheral surface 22A of the reel hub 22. The leg 94 can be shaped into a planar approximate D shape where the radius of curvature R1 is more than twice the radius of curvature R2 of the side of an inner surface 94B (i.e., where $R1 \geq 2 \times R2$). In this case, the shape of the through-hole 29 is of course also formed into the same planar approximate D shape through with the leg 94 can be inserted where the radius of curvature R1 of the outer peripheral portion 29A is more than twice the radius of curvature R2 of the central side 29B (hereafter, "inner peripheral portion") of the reel hub 22 (i.e., where $R1 \geq 2 \times R2$).

Figure 6B:
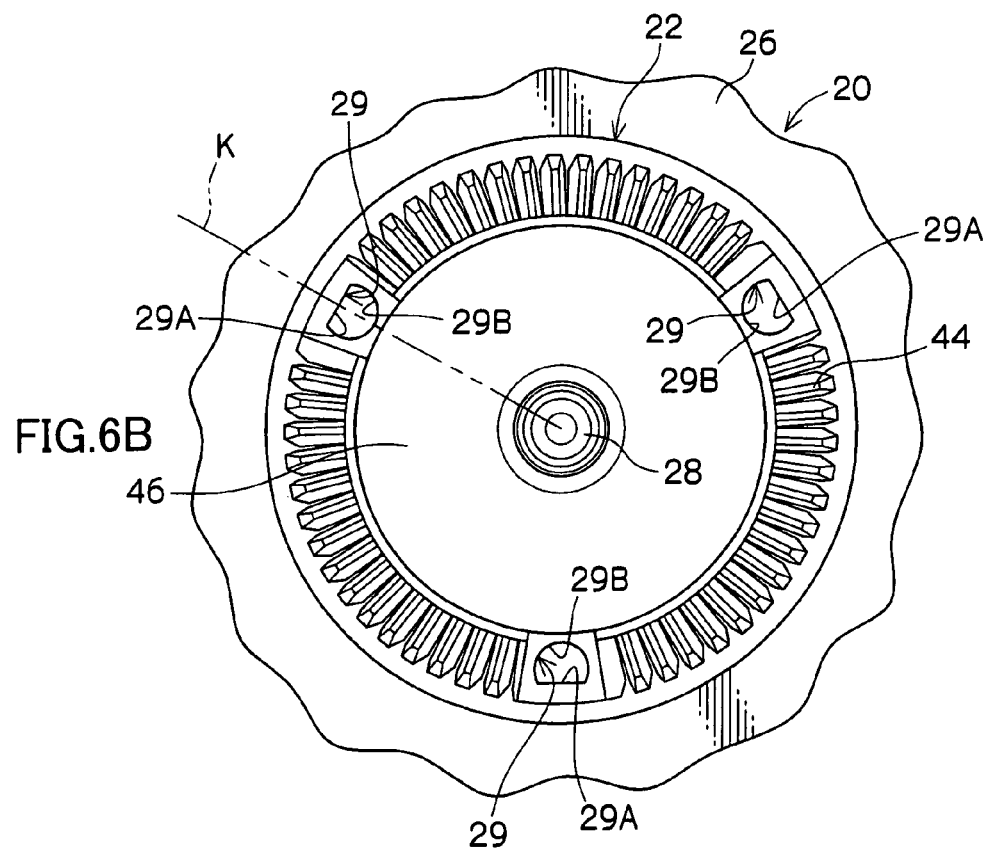
FIG. 6B is an outline bottom surface drawing of a reel hub.
Figure 7A:
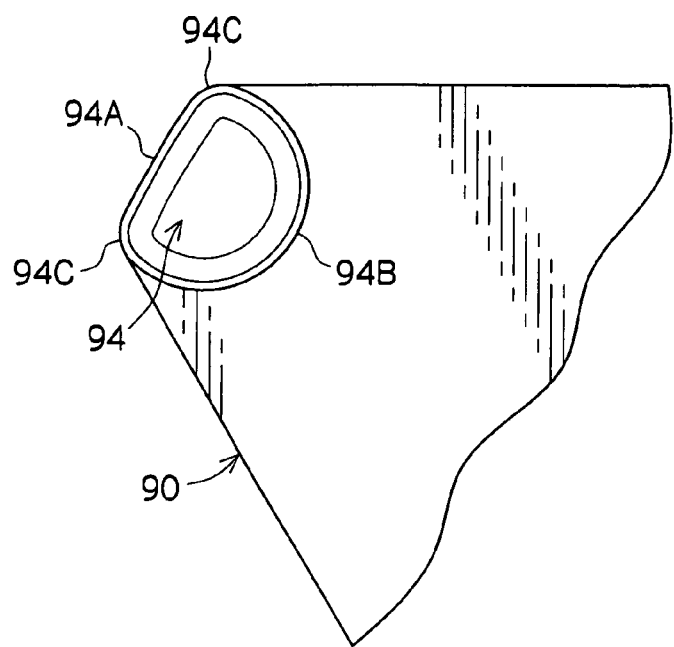
FIG. 7A is a partial outline bottom surface drawing of a release component.
Figure 7B:
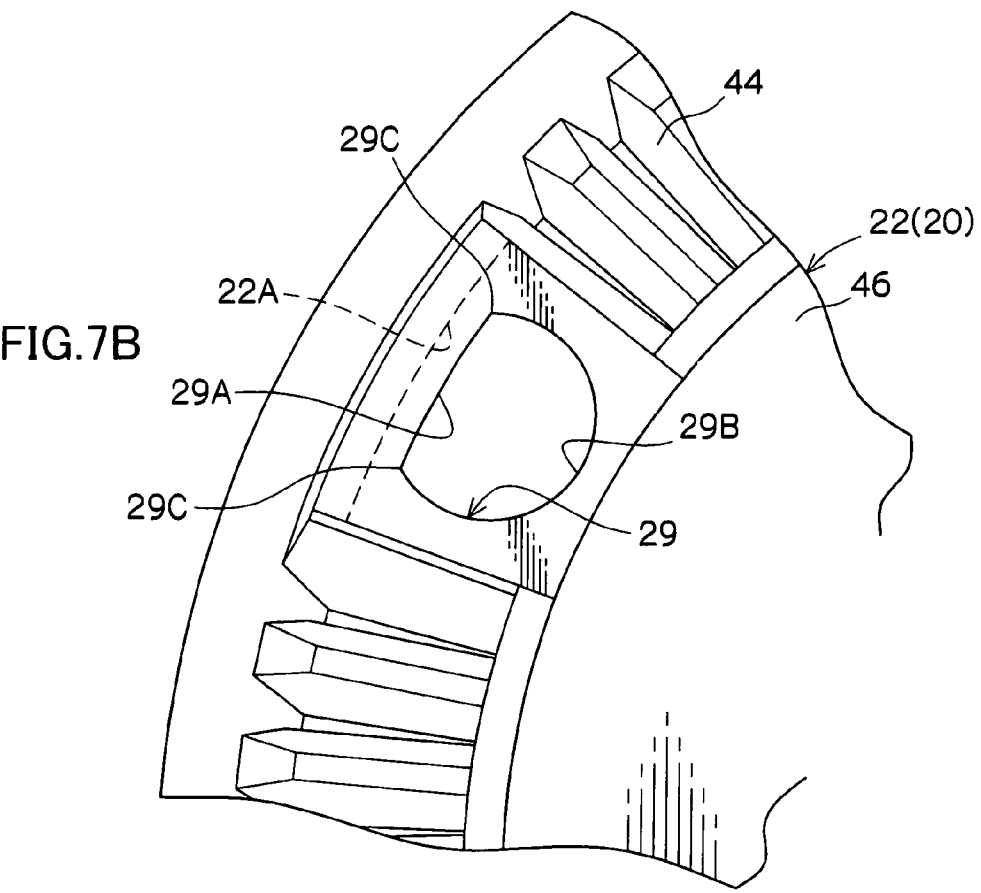
FIG. 7B is a partial outline bottom surface drawing of a reel hub.
Figure 8B:
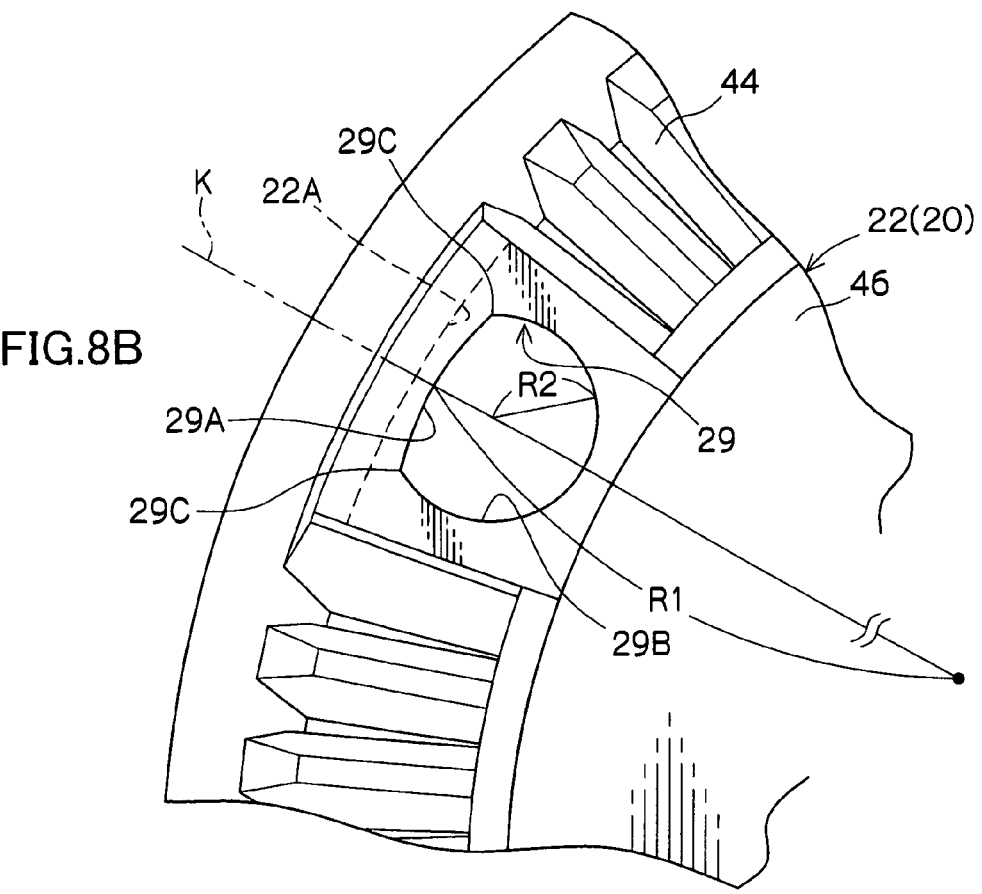
FIG. 8B is a partial outline bottom surface drawing of a reel hub.

It should be noted that in this case, it is preferable to configure the invention such that the center O of the arc of the radius of curvature R1 of the outer peripheral portion 29A of the through-hole 29 (i.e., of the outer surface 94A of the leg 94) exists on a hypothetical line K connecting from a planar view the centers of the reel hub 22 and the inner peripheral portion 29B of the through-hole 29 (refer to FIGS. 6B and 8B). By configuring the device in this manner, the shapes of the through-holes 29 (i.e., the legs 94) become, from a planar view, a symmetrical line with the hypothetical line K acting as the center and is thus preferable from an industrial design standpoint.

In either case, when the outer peripheral portion 29A of the through-hole 29 is formed into the curved line shape as described above, edges 29C of both ends of the boundary portions of the outer peripheral portion 29A and inner peripheral portion 29B in the through-hole 29 shift towards the center of the reel hub 22 more than when the outer peripheral portion 29A is formed in a straight line (i.e., the margins between the inner peripheral surface 22A of the reel hub 22 and the edges 29C become larger). For this reason, this configuration is beneficial in that the thickness of the reel hub 22 can be further increased.

Further, even if the legs 94 and the through-holes 29 are formed in the above-described approximate D shapes when viewed flat, the inner surfaces 94B of the legs 94 and the inner peripheral portions 29B of the through-holes 29 remain as arced surfaces (i.e., curved surfaces) that are the radius of curvature R2 as is, so these components can be easily formed with metal molds without problems occurring such as loss of forming characteristics (i.e., without losing the flowing attributes of the resin material).

Next, the operation of the recording tape cartridge 10 designed as described above will be explained. With the recording tape cartridge 10 configured as described above, the opening 18 is closed with the door 50 when the device is not in use (e.g., during storage, transport, etc.). Also, the recording tape T is wound around the reel hub 22 of the reel 20.

Here, the legs 94 of the releasing component 90, as shown in FIGS. 5 and 6, have outer surfaces 94A whose surfaces when viewed flat are formed into approximate D shapes corresponding to the inner peripheral surface 22A of the reel hub 22, and the through-holes 29 through which the legs 94 are inserted are also formed to appear as approximate D shapes when viewed flat. Accordingly, as shown in FIG. 9, the thickness of the reel hub 22 is formed to be thicker than in conventional devices and the rigidity thereof is thus increased. Hence, even if the amount of recording tape T wound thereon increases, deformation caused by collapse towards the interior side of the reel hub 22 is prevented.

It should be noted that, as shown in FIG. 8, the radius of curvature of the outer peripheral portion 29A of the through-hole 29 (i.e., the outer surface 94A of the leg 94) is larger than that of the inner peripheral portion 29B (i.e., the inner surface 94B). That is, the arc surface of the radius of curvature R1 made to be over twice that of the radius of curvature R2 of the inner peripheral portion 29B (at the inner surface 94B side) can be preferably formed, as shown in FIG. 7, into an arc surface parallel to that of the inner peripheral surface 22A of the reel hub 22. If configured in this manner, the portions of the edges 29C (and edges 94C) can be shifted further towards the center of the reel hub 22 more than in a case where the outer peripheral portion 29A (and outer surface 94A) is formed in a straight line (i.e., planar surface) so the thickness of the reel hub 22 can formed to be even thicker.

When using the recording tape T, a front wall 12A acts as the front and the recording tape cartridge 10 is loaded into the drive device along the direction of the A arrow. Once this occurs, firstly, the opening/closing component (not shown) provided at the drive device side engages with the protrusion 56 of the door 50. Then, in this state, when the recording tape cartridge 10 moves further in the direction of the A arrow, the opening/closing component makes the protrusion 56 resist the biasing force of the coil spring 58 while making it move relatively towards the rear. When this happens, the door 50 on which the protrusion 56 is provided so as to protrude slides towards the rear side in the grooves 64 along the right wall 12B and opens the opening 18.

In this manner, when the recording tape cartridge 10 is loaded into the drive device by a preset depth and the opening 18 opens completely, the recording tape cartridge 10 descends by a preset height and a positioning component (not shown) of the drive device is inserted into a positioning hole (not shown) formed in the bottom casing 16. Due to this, the recording tape cartridge 10 is precisely positioned inside the drive device and further sliding of the door 50 (i.e., movement towards the rear) is restricted.

Further, as shown in FIG. 9, the rotation shaft 100 approaches from the gear opening 40 relative with the descending movement of the recording tape cartridge 10 and makes the drive gear 102 engage with the reel gear 44. Once this occurs, the legs 94 protruding from the top of the reel gear 44 resist the biasing force of the compressed coil spring 98 and are pressed upwards with the engaging action of the drive gear 102 with the reel gear 44. The brake component 80 is pressed upwards via the releasing component 90, and engagement of the brake gears 84 and the engaging gears 48 is released.

Figure 9B:
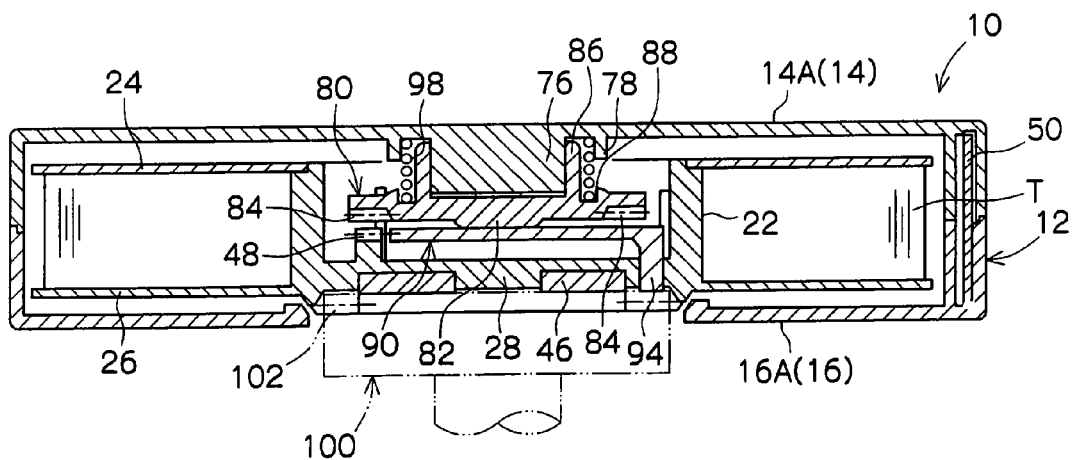
FIG. 9B is an outline side cross-sectional drawing showing a recording tape cartridge after meshing of the drive gear of the rotation shaft.

Then, when the drive gear 102 and the reel gear 44 are in a state of complete engagement, the reel plate 46 is adhered and retained by the magnetic force of a circular magnet (not shown) provided at the inner side of the drive gear 102, whereby engaging of the reel gear 44 to the drive gear 102 is maintained while the reel 20 inside the casing 12 is placed in a state of lock release whereby rotation of the reel 20 relative to the casing 12 becomes possible (see FIG. 9B).

Meanwhile, a pull-out component (not shown) provided at the drive device approaches the interior of the casing 12 from the opened opening 18 and grasps the leader pin 30 positioned and retained by the pin-retaining portions 36. It should be noted that at this time, the recording tape cartridge 10 is precisely positioned inside the drive device so the pull-out component can latch its hooks to the circular grooves 32 of the leader pin 30 with certainty. Further, the state of rotational lock of the reel 20 is released so the reel 20 can rotate with the pulling out action of the leader pin 30.

In this manner, the leader pin 30 removed from the opening 18 is accommodated on a wind-up reel (not shown). Then the wind-up reel and the reel 20 are driven and rotated at the same time, whereby the recording tape T is taken up on the wind-up reel while being gradually pulled out from the casing 12. Recording and playback of data is performed with a recording/playback head (not shown) arranged along a preset tape route.

When the recording tape cartridge 10 in which recording or playback of data has been completed is ejected from the drive device, first the rotation shaft 100 rotates in the opposite direction, whereby the recording tape T is rewound to the reel 20. Then the recording tape T is rewound until the end onto the reel 20 and the leader pin 30 is retained by the pin-retaining portions 36, whereby the recording tape cartridge 10 rises by a preset height. A positioning component (not shown) is removed from the positioning hole (not shown) while the rotation shaft 100 is removed from the gear opening 40 and the engaging of the drive gear 102 relative to the reel gear 44 is released.

Once this happens, the brake component 80 and the releasing component 90 are pressed downwards with the biasing force of the compressed coil spring 98 and the legs 94 are inserted through the through-holes 29 and while the legs 94 protrude to a preset height on the reel gear 44 from the bottom surface of the bottom wall 28, the brake gears 84 engage with the engaging gears 48. Due to this, the reel 20 enters a state of rotational lock where consequent relative rotation inside the casing 12 is blocked (see FIG. 9A), after which the recording tape cartridge 10 is moved in the direction opposite the direction of the A arrow with an ejection mechanism (not shown).

When this happens, the door 50 slides with this movement in the closed direction of the opening 18 with the biasing force of the coil spring 58 and the opening 18 closes completely (i.e., returns to its original state). In this manner, relative rotation of the reel 20 with the casing 12 is locked and the recording tape cartridge 10, whose opening 18 is closed, is completely ejected from inside the drive device.

As described above, the shapes of the legs 94 of the releasing component 90 and the shapes of the through-holes 29 provided in the bottom wall 28 of the reel hub 22 were formed into planar approximate D shapes with the outer surfaces 94A facing the inner peripheral surface 22A of the reel hub 22 (or the curved surface of the radius of curvature R1 made to be twice that of the radius of curvature R2 of the inner surfaces 94B side is a curved surface preferably parallel with the inner peripheral surface 22A of the reel hub 22). Accordingly, the thickness of the reel hub 22 can be formed to be thicker than in conventional cartridges.

Due to this, the rigidity of the reel hub 22 can be increased and deformation collapse of the reel hub 22 can be prevented. That is, a recording tape cartridge 10 that can sufficiently respond to increases in high-capacity recording can be obtained. Further, the inner surfaces 94B of the legs 94 and the inner periphery portions 29B of the through-holes 29 have arced surfaces (i.e., curved surfaces) that have the radius of curvature R2 as described above. Accordingly, when the releasing component 90 and the reel hub 22 (i.e., the lower flange 26) are formed, the flowing attributes (i.e., forming characteristics) of the resin material flowing from the center portion to the outer direction are not ruined.

It should be noted that with the recording tape cartridge of the present invention, the shapes of the leg portions are formed into flat substantially D-shaped forms cut from the outer surface sides facing the inner peripheral surfaces of the hub. The shapes of the through-holes are also formed into flat substantially D-shaped forms cut from the inner peripheral surface side of the hub to conform to the shapes of the leg portions. Accordingly, the thickness of the hub can be increased towards the inner side (i.e., towards the center of the hub). For this reason, the rigidity of the hub can be ensured so even if the recording tape cartridge has a releasing component, the cartridge can still be made to accommodate increases in recording capacity. Further, the inner surfaces of the legs and the inner sides of the through-holes (i.e., the sides toward the center of the hub) have curved surfaces (i.e., arced surfaces) that have radii of curvature as before, so the forming characteristics (i.e., flowing attributes of the resin material) are not ruined.

As described above, with the present invention, a recording tape cartridge can be provided that can accommodate increases in capacity and the hub is made to be thick even when a releasing component is provided. Further, with the present invention, the forming characteristics of components such as the releasing component are not ruined.

What is claimed is:

1. A recording tape cartridge comprising:
   a reel having a cylindrical hub with a bottom and a reel gear formed therein with recording tape wound around the outer peripheral surface of the hub;
   a casing in which the reel is singly and rotatably accommodated;
   a brake component that is provided inside the hub and made to be non-rotatable relative to the casing and which, when not in use, engages an engaging portion formed in the hub and blocks rotation of the reel; and
   a releasing component that is provided between the bottom of the hub and the brake component and which has a plurality of legs inserted through a plurality of through-holes formed on the reel gear where, when in use, the plurality of legs are pressed upwards by a drive gear of a drive device, whereby the releasing component lifts the brake component, releases engagement with the engaging portion and rotates with the reel, wherein the plurality of legs are formed into approximate D shapes in plan view whose outer side surfaces facing an inner peripheral surface of the hub are flat surfaces, while the plurality of through-holes are formed into approximate D shapes in plan view whose outer peripheral portions facing an inner peripheral surface of the hub are approximate straight-line through which the plurality of legs can each be inserted.

2. The recording tape cartridge recited in claim 1, wherein the brake component is disc-shaped and has an annular brake gear formed on a surface of the brake component facing the releasing component, and the engaging portion is formed from a gear that can mesh with the brake gear.

3. The recording tape cartridge recited in claim 2, wherein a releasing portion that contacts the releasing component is provided on the surface of the brake component facing the releasing component.

4. The recording tape cartridge recited in claim 1, further comprising a biasing component that biases the brake component towards the direction of the engaging portion.

5. The recording tape cartridge recited in claim 1, wherein the releasing component, when viewed as a planar surface, has an approximate polygon shape and a plurality of second through-holes provided therein, and the plurality of legs are provided so as to respectively protrude from each of the tip portions of the polygons.

6. A recording tape cartridge comprising:
a reel having a cylindrical hub with a bottom and a reel gear formed therein with recording tape wound around the outer peripheral surface of the hub;
a casing in which the reel is singly and rotatably accommodated;
a brake component that is provided inside the hub and made to be non-rotatable relative to the casing and which, when not in use, engages an engaging portion formed in the hub and blocks rotation of the reel; and
a releasing component that is provided between the bottom of the hub and the brake component and which has a plurality of legs inserted through a plurality of through-holes formed on the reel gear where, when in use, the plurality of legs are pressed upwards by a drive gear of a drive device, whereby the releasing component lifts the brake component, releases engagement with the engaging portion and rotates with the reel,
wherein the plurality of legs are formed into approximate bent D shapes in plan view whose outer side surfaces facing an inner peripheral surface of the hub are curved surfaces parallel to the inner peripheral surface of the hub, while the plurality of through-holes are formed into approximate bent D shapes in plan view whose outer peripheral portions facing an inner peripheral surface of the hub have an arc parallel to the inner peripheral surface of the hub through which the plurality of legs can each be inserted.

7. The recording tape cartridge recited in claim 6, wherein the brake component is disc-shaped and has an annular brake gear formed on a surface of the brake component facing the releasing component, and the engaging portion is formed from a gear that can mesh with the brake gear.

8. The recording tape cartridge recited in claim 7, wherein a releasing portion that contacts the releasing component is provided on the surface of the brake component facing the releasing component.

9. The recording tape cartridge recited in claim 6, further comprising a biasing component that biases the brake component towards the direction of the engaging portion.

10. The recording tape cartridge recited in claim 6, wherein the releasing component, when viewed as a planar surface, has an approximate polygon shape and a plurality of second through-holes provided therein, and the plurality of legs are provided so as to respectively protrude from each of the tip portions of the polygons.

11. A recording tape cartridge comprising:
a reel having a cylindrical hub with a bottom and a reel gear formed therein with recording tape wound around the outer peripheral surface of the hub;
a casing in which the reel is singly and rotatably accommodated;
a brake component that is provided inside the hub and made to be non-rotatable relative to the casing and which, when not in use, engages an engaging portion formed in the hub and blocks rotation of the reel; and
a releasing component that is provided between the bottom of the hub and the brake component and which has a plurality of legs inserted through a plurality of through-holes formed on the reel gear where, when in use, the plurality of legs are pressed upwards by a drive gear of a drive device, whereby the releasing component lifts the brake component, releases engagement with the engaging portion and rotates with the reel,
wherein the plurality of legs are formed into approximate bent D shapes in plan view whose outer side surfaces facing an inner peripheral surface of the hub have a radius of curvature that is two times or more the radius of curvature of inner side surfaces thereof, while the plurality of through-holes are formed into approximate bent D shapes in plan view whose outer peripheral portions facing an inner peripheral surface of the hub have a radius of curvature that is two times or more the radius of curvature of inner side surfaces through which the plurality of legs can each be inserted.

12. The recording tape cartridge recited in claim 11, wherein the brake component is disc-shaped and has an annular brake gear formed on a surface of the brake component facing the releasing component, and the engaging portion is formed from a gear that can mesh with the brake gear.

13. The recording tape cartridge recited in claim 12, wherein a releasing portion that contacts the releasing component is provided on the surface of the brake component facing the releasing component.

14. The recording tape cartridge recited in claim 11, further comprising a biasing component that biases the brake component towards the direction of the engaging portion.

15. The recording tape cartridge recited in claim 11, wherein the releasing component, when viewed as a planar surface, has an approximate polygon shape and a plurality of second through-holes provided therein, and the plurality of legs are provided so as to respectively protrude from each of the tip portions of the polygons.

* * * * *